(No Model.)

E. KAYLOR & H. PRUSE.
PIPE COUPLING.

No. 345,146. Patented July 6, 1886.

UNITED STATES PATENT OFFICE.

EDWARD KAYLOR AND HENRY PRUSE, OF ALLEGHENY CITY, PA.

PIPE-COUPLING.

SPECIFICATION forming part of Letters Patent No. 345,146, dated July 6, 1886.

Application filed January 20, 1885. Serial No. 153,392. (No model.)

*To all whom it may concern:*

Be it known that we, EDWARD KAYLOR and HENRY PRUSE, of Allegheny City, in the county of Allegheny and State of Pennsylvania, have invented certain new and useful Improvements in Pipe-Couplings; and we do hereby declare that the following is a full, clear, and exact description of the invention, which will enable others skilled in the art to which it appertains to make and use the same, reference being had to the accompanying drawings, which form a part of this specification, in which—

Figure 1:
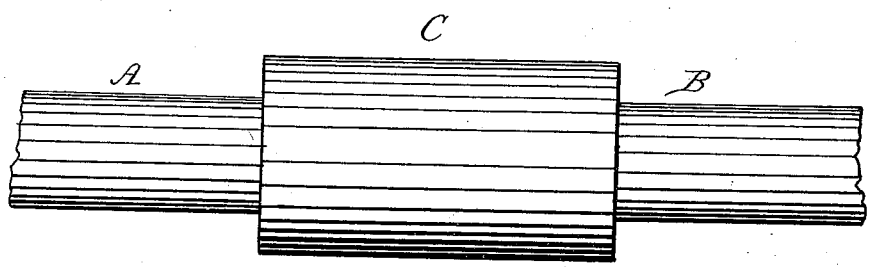
Figure 2:

Figure 1 is a side elevation; Fig. 2, a sectional view of same.

This invention has relation to couplings for gas-pipes, and has for its object to provide a coupling of such a form and construction that it shall not alone be gas-tight when first applied, but which shall remain so all the time, notwithstanding the amount of variation of pressure which shall be brought to bear upon it.

Heretofore in joining gas-pipes it has been usual to either use the screw and collar joint or the plain collar with lead or other metal as a packing to prevent the escape of the gas. These methods are generally successful in preventing the escape of the gas when first applied, but it has been found in practice that in a very short period of time the gas will begin to leak at the joints, no matter how securely they may have been made in the first place. The reason of the leakage from the joints is that as the pipes are made mostly of cast metal, which is very susceptible to the changes of heat and cold, and as the joints are practically rigid there is no provision made for the expansion and contraction of the pipes, which is largely in direction of the length of the pipes, and however small this expansion and contraction may be it will loosen the rigid joint and allow the gas to leak. Where the extremes of heat and cold are very great this expansion or contraction is sufficient to break the threads on the pipe or in the collar and entirely rupture the connection.

Our invention consists in the novel construction, combination, and arrangement hereinafter described and claimed.

Referring to the accompanying drawings, A B are the two pipes to be connected, and C is a collar for holding the pipes secure. The ends of the pipes are cast plain; but they may, if desired, be cast with a flange surrounding the edge, or, they may be threaded or barbed. The collar C, which is of somewhat larger dimension than the pipes to be joined, may also be perfectly plain, or it may have a roughened, barbed, or screw-tapped interior. In one side of the collar C is an opening, *c*, which is at about the center of the length of the collar.

A collar, D, of tin, sheet-iron, or other very thin material, is placed around the pipes at their end, the purpose of which will be more fully explained hereinafter.

The operation of the invention is as follows: The pipes to be joined are placed with their ends parallel and very near together, but not touching one another. The tin collar D is then brought over the space between the ends of the pipes, the collar C being placed over the joint, the opening *c* being directly over the collar D. A cap is then placed over the ends of the collar, and some plastic material, or composition in a heated condition—such as rubber or vulcanite—is forced through the hole *c* into the collar C, entirely filling the space inside of the collar between the interior thereof and the outside of the pipes, the collar D preventing it from filling up the space between the ends of the pipes, but not offering sufficient resistance to prevent the pipes from expanding or contracting. This filling will prevent all leakage at the joints, and at the same time, on account of its elasticity, will allow the pipes to expand and contract without destroying the tightness of the joint.

Having described our invention, we claim—

1. The combination of the pipes A B, the collar D, embracing the opposite ends of said pipes, the collar C, having the opening *c*, and of greater diameter than the pipes A B, and the rubber filling interposed between the collar C and the pipes A B, substantially as described.

2. The combination of the pipes A B with the collar C, consisting of an undivided tubular section surrounding the ends of the same, and an elastic filling consisting of rubber or similar packing interposed between said collar and the pipe and occupying the entire annular space, said pipe ends being entirely separated from the said collar by said filling, whereby a flexible or yielding coupling is produced, substantially as described.

3. In a pipe-coupling, the combination, with the adjacent pipe-sections and a collar of larger diameter than said sections surrounding the adjoining ends of the pipes, and leaving an annular space between the pipes and the collar, of an elastic material consisting of rubber or similar packing, filling said space and forming the only connection between the pipe ends and the collar, substantially as shown and described.

In testimony that we claim the foregoing as our own, we have hereto affixed our signatures in presence of two witnesses.

EDWARD KAYLOR.
HENRY PRUSE.

Witnesses:
A. A. MOORE,
A. A. CONNOLLY.